(12) United States Patent
Goldy et al.

(10) Patent No.: US 8,739,740 B2
(45) Date of Patent: Jun. 3, 2014

(54) PET LEASH

(76) Inventors: Robert Goldy, New York, NY (US);
Edwin Chan, Brooklyn, NY (US)

( * ) Notice: Subject to any disclaimer, the term of this patent is extended or adjusted under 35 U.S.C. 154(b) by 477 days.

(21) Appl. No.: 13/059,132

(22) PCT Filed: Aug. 14, 2009

(86) PCT No.: PCT/US2009/053812
§ 371 (c)(1),
(2), (4) Date: Feb. 15, 2011

(87) PCT Pub. No.: WO2010/019842
PCT Pub. Date: Feb. 18, 2010

(65) Prior Publication Data
US 2011/0197820 A1    Aug. 18, 2011

Related U.S. Application Data

(60) Provisional application No. 61/089,303, filed on Aug. 15, 2008.

(51) Int. Cl.
*A01K 27/00* (2006.01)

(52) U.S. Cl.
USPC ............................................ 119/796

(58) Field of Classification Search
USPC .............................. 119/795–798, 61.5, 61.56
IPC .................................... A01K 5/01,39/00, 27/00
See application file for complete search history.

(56) References Cited

U.S. PATENT DOCUMENTS 4,886,016 A * 12/1989 Atchley ...................... 119/61.54
5,887,550 A * 3/1999 Levine et al. ................. 119/796
5,890,456 A * 4/1999 Tancrede ...................... 119/794
7,194,982 B2 * 3/2007 Edwards ....................... 119/796
8,109,234 B1 * 2/2012 LeCoq ........................ 119/61.56

(Continued)

FOREIGN PATENT DOCUMENTS

| CA | 2323174 A1 | 4/2002 |
| CN | 201029358 | 3/2008 |
| GB | 1389841 | 4/1975 |
| WO | 0120407 A1 | 3/2001 |

OTHER PUBLICATIONS

Chinese First Office Action relating to Chinese application No. 200980137825.5, dated Jul. 3, 2012.

(Continued)

*Primary Examiner* — David Parsley
*Assistant Examiner* — Thien Thanh Pham
(74) *Attorney, Agent, or Firm* — Dinsmore & Shohl LLP

(57) ABSTRACT

A pet leash and a method of making and using same. In one embodiment, the leash includes one or more features for improving functionality. In one form, such features include one or more compartments (40A), lighting and timing components or a combination thereof. One such feature is the ability to include numerous recesses into the housing (20) and grip (30). This allows multiple devices, such as a pet water bowl, pet treat compartment and one or more pet waste bags to be stored within the leash. In a particular form, the water bowl is made in a collapsible configuration to facilitate placement in the housing when not in use, and to allow it to expand when removed for use. In a particular form, the recesses formed in the housing to hold the various devices may be spaced around a portion of the housing used to contain a pet leash line and its associated retraction mechanism.

19 Claims, 5 Drawing Sheets

(56) References Cited

U.S. PATENT DOCUMENTS

| | | | |
|---|---|---|---|
| 2005/0087148 A1* | 4/2005 | Rabello | 119/796 |
| 2005/0115520 A1* | 6/2005 | Mancini | 119/796 |
| 2006/0162674 A1 | 7/2006 | Neiser | |
| 2006/0162974 A1* | 7/2006 | Richard et al. | 180/68.3 |
| 2006/0219182 A1* | 10/2006 | Rabello | 119/61.56 |
| 2008/0216767 A1* | 9/2008 | Wang | 119/795 |

OTHER PUBLICATIONS

International Search Report and Written Opinion completed Nov. 5, 2009 pertaining to international Application No. PCT/US2009/053812.

* cited by examiner

PET LEASH

CROSS-REFERENCE TO RELATED APPLICATIONS

This application is a U.S. national phase entry of International Application No. PCT/US2009/053812 filed Aug. 14, 2009, which claims the benefit of U.S. Provisional Application Serial No. 61/089,303, filed Aug. 15, 2008.

This application relates generally to an improved leash for pets, and more particularly to multifunction pet leashes.

There are a variety of leashes currently on the market, including those that are retractable to control the pet's freedom of movement. In general, such leashes have a handle, a lock and the ability to retract a line that extends from the leash to the pet. Some may allow separate attachment of a light bulb, radio or the like, while still others to have waste bags as a separate component. Others have a fabric-based foldable bowl that can be used to provide water to the pet. Despite this, there remains a desire for a leash with enhanced functional attributes, as well as ability to integrate such attributes into the leash.

These desires are met by the present invention, where an improved pet leash is disclosed. It will be appreciated by those skilled in the art that while the presently-disclosed leash is useful for numerous domesticated pets, it is particularly applicable for dogs. In a first aspect of the invention, the pet leash includes a housing, a grip (or handle) and a line retractably coupled to said housing. The leash also includes numerous hollowed-out recesses or related compartments that can be used as storage. Some or all of these recesses can be enclosed by a cover that cooperates with or is formed in the housing to selectively enclose the compartments defined by the respective recesses. In this way, removal of the one or more covers allows access to the various compartments. For example, if the compartment is used to store pet waste bags, removal of the cover can allow a user to add more bags to the compartment. Likewise, in configurations where the compartment is for a water bowl, removal of the cover (which, as described below, may form the bottom part of the water bowl), may allow the bowl to be filled with water or other liquid for the pet's consumption, while removal of or hinged opening of the pet treat compartment allows the user access to pet treats or other foodstuffs. In addition to water and related liquids, the water bowl can also be used for food.

Optionally, the means for retracting the line include a spring-loaded switch (such as a button or thumbswitch) cooperative with the line such that upon engagement of the switch, the line is locked into place such that the spring (such as a coil spring) is inhibited from increasing or decreasing tension on the line. In the present context, the term "line" is meant to include all generally suitable forms of elongate, flexible means for attaching the leash housing at one end and an animal collar, harness or related device at the other end. Examples of such a line may include rope, cord, string or related article, all of which can be formed from natural or synthetic materials to have a round, flattened or other similar cross-sectional profile. In addition, the spring-loaded mechanism can be to disposed in between the pet treat and water bowl compartments that are formed in the housing.

In another option, the various recesses include the aforementioned pet treat compartment and water bowl compartment, which can be placed on opposite sides of the housing from one another. Either or both of these compartments may include a cover that will rotate or slide open to allow the user to easily remove the cover. In still another option, the recess corresponding to the pet waste bag compartment is formed in the grip. In an alternate form, the pet treat compartment may be used to hold other small items, such as a user's keys, jewelry or the like.

The water bowl that can fit within the water bowl compartment discussed above is preferably of a substantially cylindrical shape such that the bottom of the water bowl defines the cover while an inwardly-projecting part may form the bowl wall. The term "substantially" in the present context refers to an arrangement of elements or features that, while in theory would be expected to exhibit exact correspondence or behavior, may in practice embody something slightly less than exact. As such, the term denotes the degree by which a quantitative value, measurement or other related representation may vary from a stated reference without resulting in a change in the basic function of the subject matter at issue.

In one particular form, the water bowl is constructed as a collapsible accordion-like structure along its axial dimension so that when stored in the compartment, it defines an axially squat profile relative to its removed, expandable condition. This allows the water bowl to be compressed while being stored in the compartment so that it takes up less room in the housing. The bottom of the bowl can include a threaded screw connection to the housing to allow a twist-off connection between them. An indent or projection formed in the cover can help facilitate the use of a thumb or finger to rotate the cover on and off the housing. In another configuration, the bottom of the bowl can include a detent or related tab that allows the cover to be snapped into a secure position to within the housing recess. In this way, when the cover is snapped off and removed, it allows the user to unfold the creased walls to create the water bowl. The folding out of the walls is similar to a flexible drinking straw where the side walls collapse and expand with usage. Regardless of the means used to secure the bowl to the recess formed in the housing, the bowl and cover can be made from conventional plastic or related materials. Similarly, others (such as a silicone-based material) may optionally be employed for the collapsible walls of the bowl, subject to cost and manufacturability considerations. Such material (with its inherent flexibility) may allow the water bowl to avoid the need for the creased walls of the accordion-like structure discussed above. In another configuration, a bowl made from a silicone-based material may still employ the previously-discussed accordion-like structure. In another configuration, the base of the bowl (which corresponds to the cover that forms part of the outer surface of the housing) may be made from a different material than the walls. For example, where the walls may be made from a relatively thin, flexible material (such as a silicone-based material), the base/cover may be made from a more rigid material (such as a relatively stiff plastic or related resin).

In still another option, the pet treat compartment may, like the water bowl, define a substantially cylindrical shape. The depth of the pet treat compartment may be generally similar to that of the bowl when the bowl is in its stored shape within the leash housing. It will be appreciated by those skilled in the art that the thickness of both the water bowl and the pet treat compartment is limited by the retracted line as it is being stored in the middle part of the housing, as well as by the spring and related ancillary mechanism used to affect such retraction. The pet treat compartment may include a hinge formed in its cover. This hinged cover may also include a snap-fit construction to allow secure closure connection to the housing. In addition, the entire pet treat compartment may be snap-fit into its corresponding recess formed in the housing; such feature allows the entire compartment to be removed for cleaning. As with the water bowl, the pet treat compartment may be made from plastic or other resin-based, syntehetic materials. In one form, the hinge may be no more than a score line formed across the diameter of the compartment.

In another option, the grip is formed with the housing as a one-piece molding. For example, such molding could include right-side and left-side mirror-image halves that would allow subsequent placement of other components, such as the retraction mechanism or an electric power supply into the housing and grip, after which the two halves can be joined together by screws, welding, adhesive or other well-known means. In the case of a portable electric power supply, such as one or more batteries, the housing, grip or both may include one or more output devices that can be powered by the electric supply. One of the output devices can be a light, while another can be a display. In one exemplary form, the display can be a clock, timer or related device that can be used as a stopwatch or other timekeeping apparatus. In a preferable form, when the output device is a clock, it includes a permanent (i.e., dedicated) electrical connection to the power supply, while in situations where the output device is a light (such as for illuminating a user's way in dark surroundings), the connection to the power supply is selective, such as through the aforementioned switch. Such switch can be provided to turn the light on and off, thereby lengthening power supply life.

According to another aspect of the invention, a pet leash is disclosed. The leash includes a housing configured to contain a retractable leash line. The housing defines at least first and second recesses, where one has a pet treat compartment received in, attached to, formed in or otherwise engaged with it, and the other has a water bowl compartment where a water bowl (such as that discussed in the previous aspect) can also be received, mounted, connected or otherwise engaged with it. A grip is attached to or formed integrally with the housing, and defines another recess that functions as a pet waste bag compartment. In this way, one or more clean plastic bags can be compacted and stored in the compartment such that it can be readily retrieved by a user when needed. Numerous covers, in addition to giving definition to the corresponding outer surface of the housing or the grip to which they are affixed, enclose a respective one of the first, second and third recesses. As discussed in the previous aspects, at least the cover corresponding to the water bowl may form the base of the bowl, may be threadably secured or snap-fit to the housing, may be constructed such that it can be compressed or to otherwise compacted into its corresponding recess to allow it to fit therein, and may be formed of a suitable material compatible with the remainder of the housing. Likewise, cover corresponding to the pet treat compartment may include a hinge and snap-fit closure features, and may be secured to the housing through snap-fit features. As with the water bowl, the pet treat compartment may be formed of a suitable material compatible with the remainder of the housing. In addition, the leash includes a line retractably coupled to the housing such that when in a retracted state, the line is substantially contained within the housing. A battery or related portable electric power supply is included with the housing or grip in such a way as to provide electric current to power a light, clock or both. A switch allows selective application of the portable electric power supply to the clock, light or other output device.

According to yet another aspect of the invention, a method of making a leash that can be used to walk a pet is disclosed. The method includes providing a housing and a place for a user to grip the housing, providing a line that is attached at a first end to the housing and attachable at a second end a pet, pet collar or both, providing numerous recesses in the housing, where a pet treat compartment is fitted in or is formed as part of one of the recesses while a removable water bowl is fitted in another of the recesses, and providing at least one compartment in the place for user to grip the housing.

Optionally, the compartment provided in the grip is a pet waste bag compartment, such that it can hold one or more unused pet waste bags. In addition, providing the removable water bowl may more specifically include providing a collapsible water bowl such as that discussed in the previous aspects. The method may further include coupling a portable electric power supply to one or both of the housing and the grip. In this way, one or more output devices situated on or formed in the housing that are electrically coupled to the portable electric power supply can be operated. The output device may be one or more of a clock that is dedicatedly coupled to the portable electric power supply and a light that is selectively coupled through a switch to the portable electric power supply. The pet treat compartment and the water bowl may be disposed on substantially opposite side of the housing from one another. Furthermore, a retraction mechanism to (such as a spring-loaded device) used to provide selective tensioning to the leash line may be placed in the housing substantially between the pet treat compartment and the water bowl. This provides a volumetrically efficient structure that promotes multifunction capability within the leash while simultaneously keeping its size small enough that a user can hold it with one hand.

The principles of the disclosed invention become clear in the following description of the figures.

Figure 1:
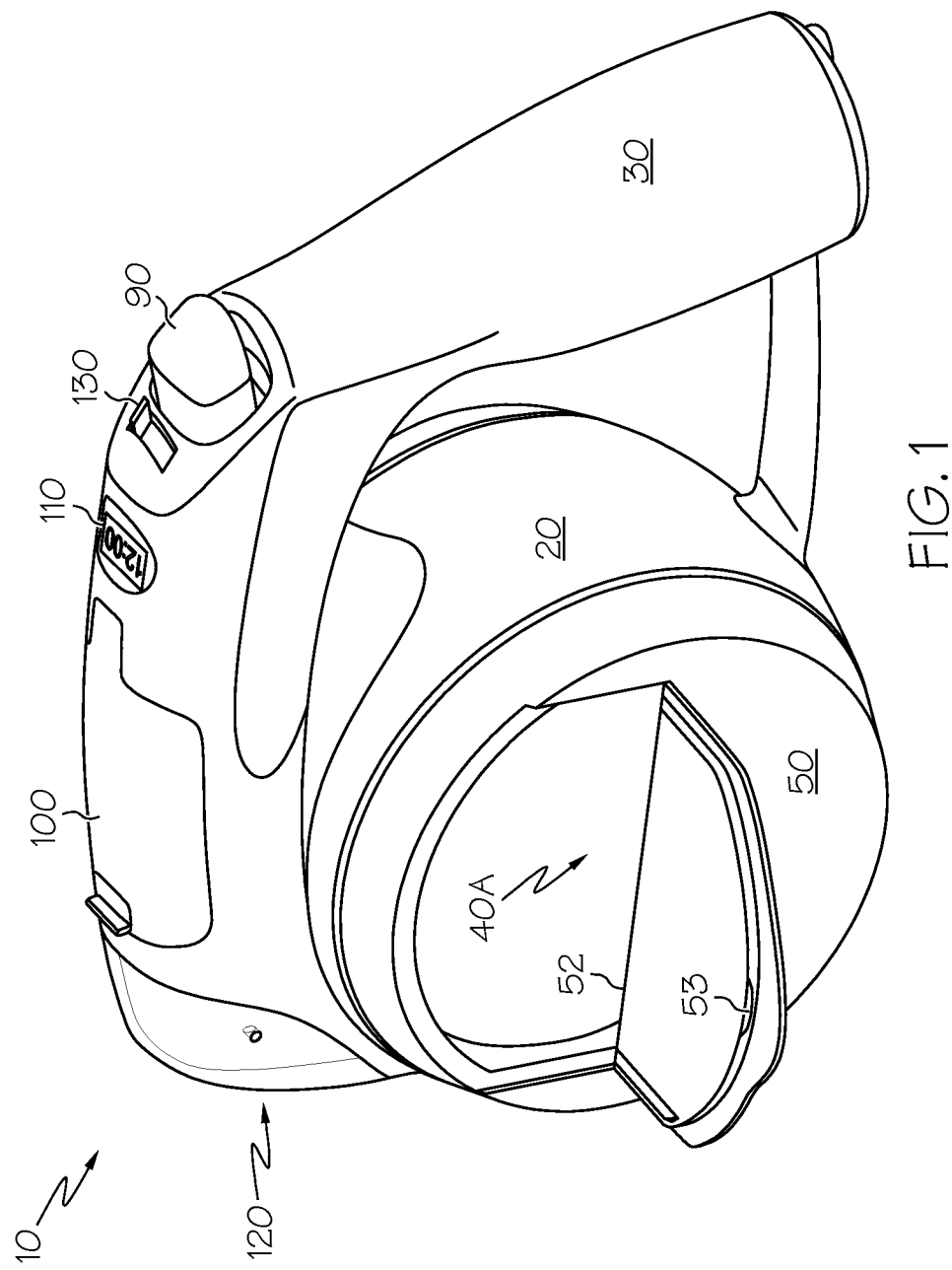
FIG. 1 shows a generally left elevation view of one side of a pet leash according to an aspect of the present invention where a hinged cover is open to expose a first storage compartment inside.
Figure 3:
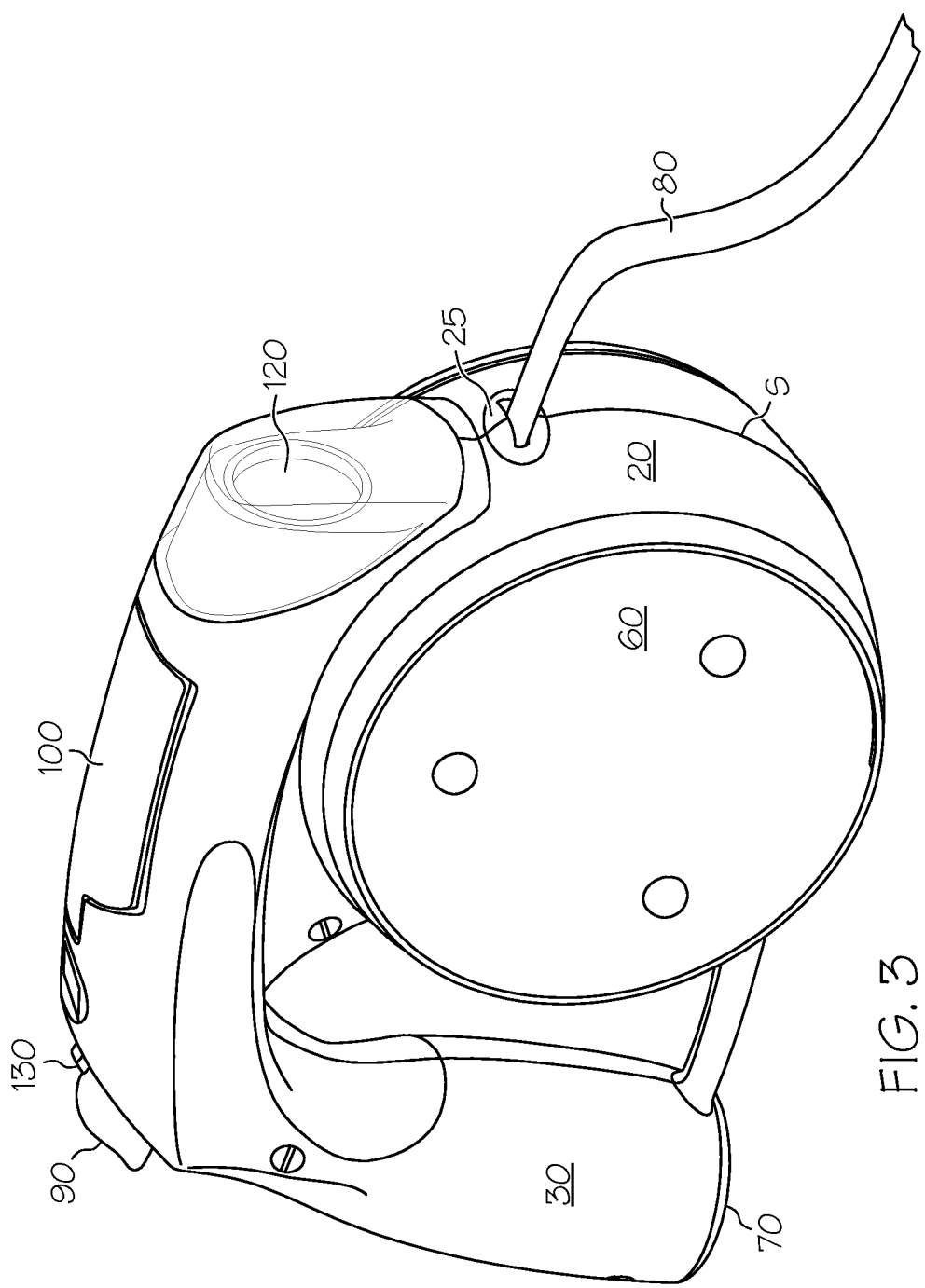
FIG. 3 shows a more forward elevation view of the pet leash of FIG. 2, showing where a line used to secure the leash to a pet passes into the leash housing, as well as an alternate embodiment of the cover used for the second storage compartment.

Referring first to FIGS. 1 and 3, a pet leash 10 includes a generally cylindrical to housing 20, and a grip or handle 30 that is secured to the housing 20. FIG. 1 shows a generally left-side view of leash 10, while FIG. 3 shows a generally right-side view. In one preferred form, the housing 20 and grip 30 are formed from a plastic or related synthetic material, and more preferably, are molded together as a single piece structure. With such construction, the housing 20 and grip 30 may be formed from left-side and right-side mirror-image molded halves that can be subsequently joined together at a seam or split-line S (shown with particularity in FIG. 3) through screws, rivets or other fasteners, adhesive, snap-fit detents or other joining methods known to those skilled in the art to form an integral structure. In the present context, the term "integral" and its variants shall be understood to mean that the component in question is either a one-piece article or has its assembled features rigidly secured to each other in such a way as to have them be integral in a functional sense. As such, when the various components making up an assembly are integrated with one another, or are assembled to form an integral structure, they cooperate with one another to form part of the integral whole. Likewise, the use of screws (not labeled, but shown in FIG. 3) will be understood to give the split halves of the housing 20 and grip 30 an integral structure upon assembly, as would welding, riveting or permanent adhesive of the split halves.

Housing 20 and grip 30 are sized to accommodate recesses 40, of which recess 40A forms a first example in housing 20. As discussed above, these recesses can accommodate storage areas that by virtue of being integrated into the leash 10 provide a volumetrically-efficient alternative to separate storage compartments. In a preferred form, a pair of recesses 40A and 40B extend inward from respective left and right sides of the housing 20, while a retracting mechanism (such as a coil spring or the like, not shown) may be placed in a region defined between the two recesses 40A and 40B. Disposed within recess 40A is a compartment with cover 50. A hinge 52 and detent 53 allow the cover 50 to provide selective user access to the compartment underneath. In one form, the compartment (which occupies part of all of the substantially cylindrical space formed by recess 40A) can be used to store pet treats, while in another, the compartment may be used to store small objects, such as keys, jewelry or the like. In a preferred form, the cover 50 is made from a plastic material. In this way, not only does to the cover forma lightweight, inexpensive part of the leash 10, but allows the hinge 52 to be integrally formed, such as by scoring or a related line of weakness formed therein.

A button or thumbswitch 90 can be used as a lock to control movement of the retraction mechanism (not shown). By way of example, the retraction mechanism may include a coil spring that when activated pulls on a proximal end of line 80 that is affixed to the spring in housing 20. In such way, it promotes withdrawal of the line 80 into the housing 20. When a distal end of the line 80 is attached to a pet (such as through connection to a collar, harness or like device), the retraction motion creates additional tension on line 80, thereby coaxing the pet back toward the user. In a particular form, the retraction mechanism can be in an activated state until such time as a user depresses the button 90, at which time the mechanism locks the leash line 80 so that it can not lengthen by pulling.

As shown with particularity in FIG. 3, a generally forward-facing aperture 25 can be used to allow passage of leash line 80 into and out of housing 20. As discussed earlier, while leash line 80 is shown with a generally flat, ribbon-like profile, it will be appreciated by those skilled in the art that other cross-sectional line profiles may also be employed, subject to space limitations within housing 20.

Various electrical devices may be included in the housing 20, including an access door 100 for batteries or other power supply (not shown). A display 110 in the form of a digital readout clock can be powered by the batteries, as can a light 120 that is disposed on a forward end of the housing 20. A switch 130 can be used to turn the light 120 on and off, as needed. In a particular form, the light 120 can be covered with a clear, optically transparent shroud, thereby not only protecting the lens of the light 120, bus also providing an aesthetically-pleasing profile to the leash 10.

Figure 2:
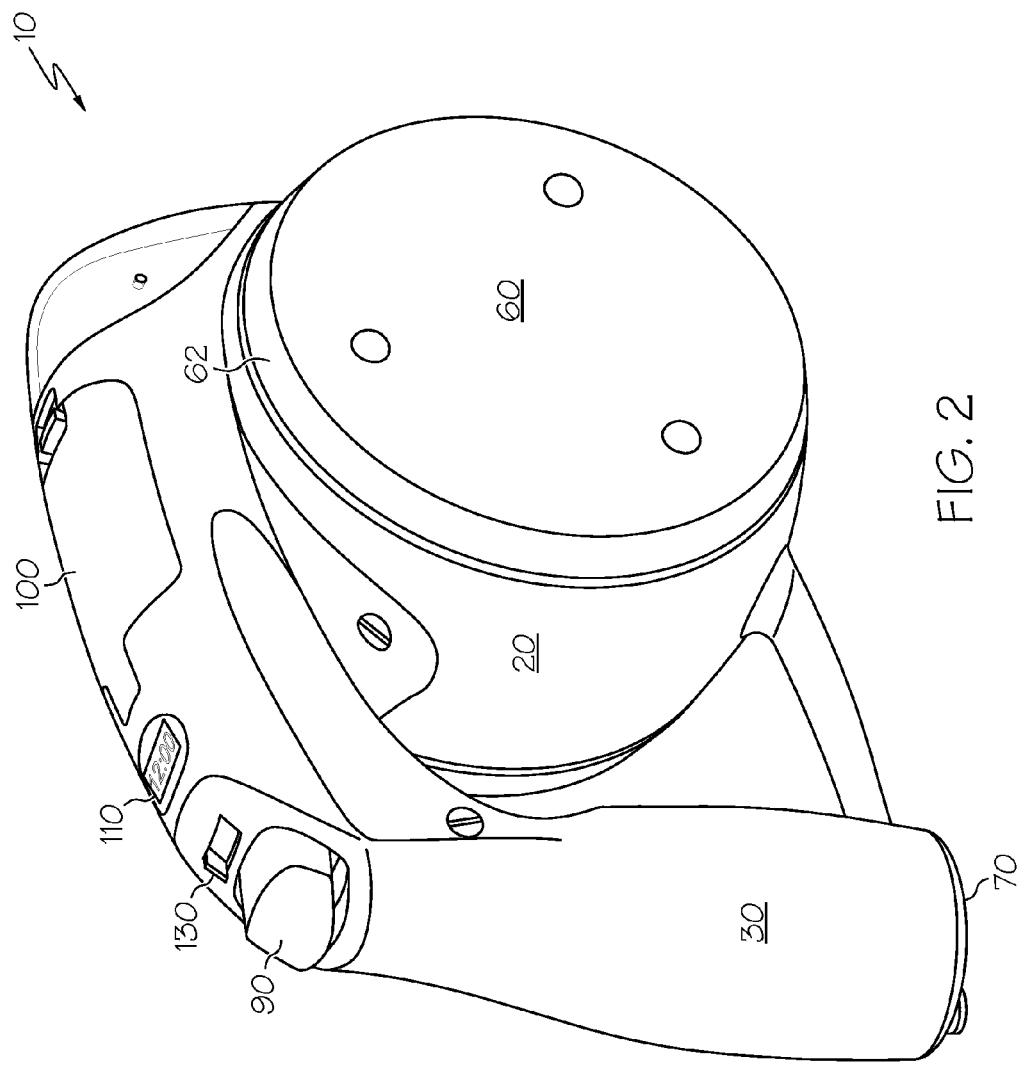
FIG. 2 shows a generally right elevation view of the opposing side of the pet leash of FIG. 1, where a cover is used to enclose a second storage compartment inside.
Figure 4:
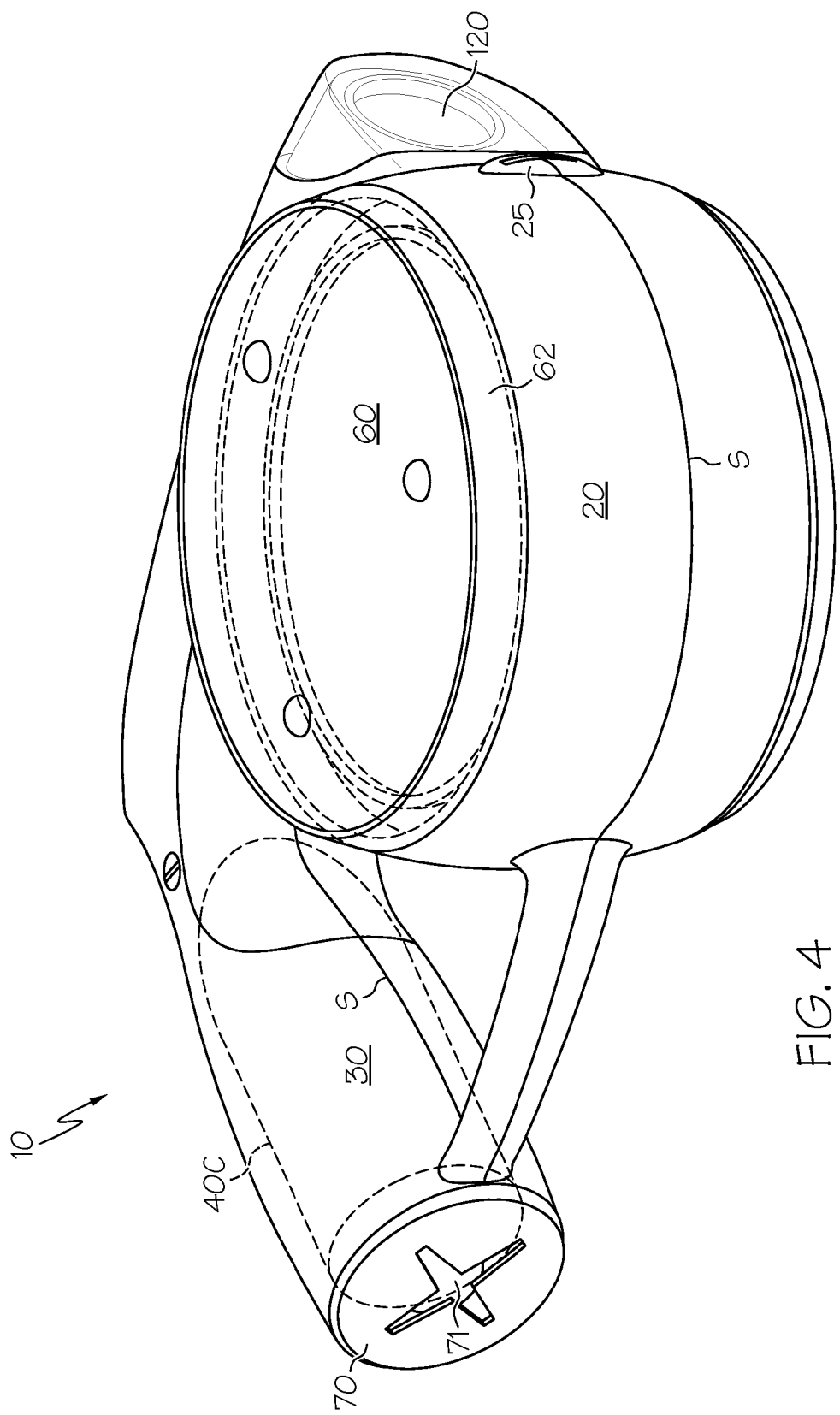
FIG. 4 shows a generally bottom view of the opposing side of the pet leash of FIG. 3, highlighting a third storage compartment that, unlike the first and second storage compartments, is disposed within the grip.

Referring next to FIGS. 2 and 4, a right-side view of leash 10 is shown, highlighting that a second storage area is formed within housing 20 beneath cover 60. The storage area corresponding to recess 40B (which is shown with particularity in FIG. 4) is in the form of a compartment for a water bowl 62, of which cover 60 forms the base or bottom. As shown with particularity in FIG. 2, water bowl 62 may be unscrewed from housing 20 by gripping the periphery of the bowl 62 or cover 60 and twisting along cooperating threads (not shown) on the bowl 62 and housing 20. Screws (shown), rivets or related fasteners can be used to secure grip 30 to housing 20. As shown with particularity in FIG. 4, the generally bottom right-side view of the leash 10 highlights the split line S between halves of the housing 20 and grip 30, as well as the general thickness dimension of the water bowl 62. The thickness of the bowl 62 and the pet treat compartment beneath cover 50 in FIG. 1 demonstrate that both may be formed into housing 20 while maintaining ample space for the line 80 and the retraction mechanism. In addition, placement of a third recess 40C is shown within the handle formed by grip 30. Cover 70 includes a generally cross-shaped cutout 71 formed therein to enable a user to remove one or more pet waste bags that can be stored in a compartment defined by recess 40C. The bags (not shown) have an end or tip protruding through the cutout 71 so that the user can grasp a bag at the tip. In one form, the waste storage bags can be secured together sequentially and perforated periodically so that when the user tugs on the outermost bag, the edges formed by the cutout 71 will promote severance of adjacent bags along the bag perforations. Cover 70 may be removed, such as by a detent or related snap-fit connection to the opening in grip 30, or by a screwed, threaded connection. In situations where cover 70 includes a snap-fit connection to grip 30, it may also include a tail or related string that attaches it to the grip 30 to prevent losing the cover 70.

Figure 5:
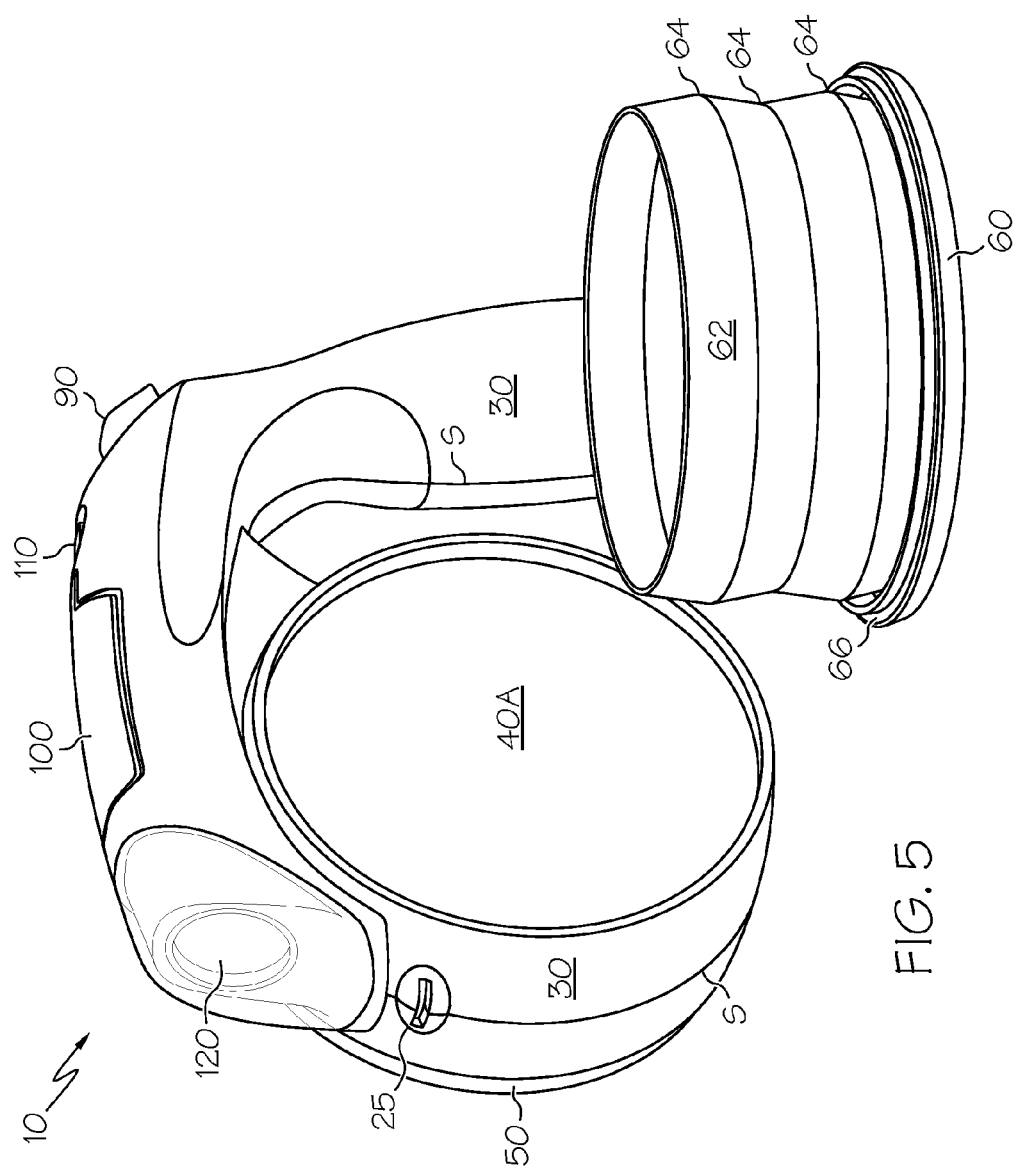
FIG. 5 shows a more forward elevation view of a pet leash according to another aspect of the present invention where an expandable water bowl can be detached from the housing.

Referring next to FIG. 5, an alternate placement of the devices in recesses 40A and 40B are shown. Unlike the version shown in FIGS. 1 through 4, water bowl 62 with cover 60 is mounted into the left-side of housing 20, while the pet treat compartment with cover 50 is shown on the right-side. The water bowl 62 is specifically shown in its accordion-like configuration, where the bottom or base formed by cover 60, which includes a ridge 66 that can form a snap-fit connection with a complementary surface around the periphery of the opening to recess 40A, is formed with or otherwise joined to the upstanding wall that includes numerous creases 64 that are rigid enough to stand upright on their own, yet flexible enough to allow the wall to fold into a more compressed shape. As can be seen, the folded shape occupies a rather thin depth into the housing 20 in order to not interfere with the portions of the leash 10 that make up the line 80 (not presently shown) and the retraction mechanism (not shown). Inherently flexible materials, such as a silicone-based material or a flexible plastic made of a relatively thin-walled structure, can be used for the wall of the water bowl 62. Although not shown, water bowl 62 may also attach to the recess 40A in housing 20 through a threaded arrangement as previously discussed.

It will be apparent to those skilled in the art having regard to this disclosure that other modifications of this invention beyond these embodiments specifically described here may be made without departing from the spirit of the invention. Accordingly, such modifications are considered within the scope of the invention as limited solely by the appended claims.

The invention claimed is:
1. A pet leash comprising:
a housing defining a plurality of recesses therein and disposed on opposing sides thereof, at least one of said plurality of recesses comprising a water bowl compartment;
a grip attached to said housing, said grip defining another recess formed therein that defines a pet waste bag compartment;
a plurality of covers each of which are configured to selectively enclose a respective one of said plurality of recesses;

a substantially cylindrical water bowl selectively disposable in said respective one of said plurality of recesses, said water bowl comprising a collapsible structure having an accordion shape along its axial dimension such that when placed in said respective one of said plurality of recesses, a bottom of said water bowl defines said respective one of said plurality of covers such that when said water bowl is compressed or otherwise compacted into one of said plurality of recesses, said water bowl fits therein to leave an outer dimension of said housing substantially unchanged;

a line retractably coupled to said housing such that when in a retracted state, said line is substantially contained within said housing; and means for retracting said line into said housing.

2. The pet leash of claim 1, wherein said means comprises a spring-loaded mechanism and a locking switch cooperative with said line such that upon engagement of said switch, extension or retraction of said line by said spring-loaded mechanism is inhibited.

3. The pet leash of claim 2, wherein said spring-loaded mechanism is disposed in said housing substantially between a pet treat compartment and said water bowl compartment.

4. The pet leash of claim 1, wherein another of said plurality of recesses comprises a pet treat compartment disposed on an opposing side of said housing from said water bowl compartment.

5. The pet leash of claim 1, wherein said water bowl is made from a molded silicone-based material.

6. The pet leash of claim 1, wherein said water bowl comprises one of a snap-fit connection to said housing and a threaded screw connection to said housing.

7. The pet leash of claim 1, wherein said pet treat compartment comprises a hinge formed in said respective cover.

8. The pet leash of claim 7, wherein said pet treat compartment hinged cover comprises a snap-fit connection to said housing.

9. The pet leash of claim 1, wherein said grip is integrally formed with said housing.

10. The pet leash of claim 1, further comprising:
a portable electric power supply disposed in at least one of said housing and said grip;
at least one output device selectively coupled to said portable electric power supply to receive electric current therefrom; and
a switch to provide said selective coupling between said at least one output device and said portable electric power supply.

11. The pet leash of claim 10, wherein said at least one output device comprises at least one of a light and a display.

12. The pet leash of claim 11, wherein said display comprises at least one of a clock and a timer.

13. The pet leash of claim 10, wherein said at least one output device comprises a plurality of output devices comprising a light and a display.

14. The pet leash of claim 10, wherein said portable electric power supply comprises at least one battery.

15. A pet leash comprising:
a housing configured to contain a retractable leash line therein, said housing further defining a first recess comprising a pet treat compartment therein and a second recess comprising a water bowl compartment therein;
a grip attached to said housing, said grip defining a third recess comprising a pet waste bag compartment therein;
a plurality of covers each of which are configured to selectively enclose a respective one of said first, second and third recesses;
a substantially cylindrical water bowl disposable within said water bowl compartment, said water bowl comprising a collapsible structure having an accordion shape along its axial dimension such that a bottom of said water bowl defines a respective one of said covers such that when said water bowl is compressed or otherwise compacted into said water bowl compartment, said water bowl fits therein to leave an outer dimension of said housing substantially unchanged;
a line retractably coupled to said housing such that when in a retracted state, said line is substantially contained within said housing;
a portable electric power supply disposed in at least one of said housing and said grip;
at least one of a light and a clock selectively coupled to said portable electric power supply to receive electric current therefrom; and
a switch to provide said selective coupling between said at least one output device and said portable electric power supply.

16. A method of making a pet leash, said method comprising:
providing a housing and a place for a user to grip said housing;
providing a line that is attached at a first end to said housing and attachable at a second end to at least one of a pet and a pet collar;
providing a plurality of recesses on opposing sides in said housing wherein one of said plurality of recesses is configured to receive a removable water bowl in a side thereof and another of said plurality of recesses is configured to define a storage compartment therein;
providing a pet treat compartment in a first of said plurality of recesses;
providing a removable water bowl in a second of said plurality of recesses, said removable water bowl comprising a collapsible structure having an accordion shape along its axial dimension and a bottom that, when said removable water bowl is disposed within said housing, defines a cover for said respective one of said plurality of recesses such that when said water bowl is compressed or otherwise compacted into said respective one of said plurality of recesses, said water bowl fits therein to leave an outer dimension of said housing substantially unchanged; and
providing at least one compartment in said place for user to grip said housing, said at least one compartment configured to store pet waste bags therein.

17. The method of claim 16, further comprising:
coupling a portable electric power supply to at least one of said housing and said place for a user to grip said housing; and
providing at least one output device on said housing such that said at least one output device is electrically coupled to said portable electric power supply.

18. The method of claim 17, further comprising said at least one output device as a clock that is dedicately coupled to said portable electric power supply and a light that is selectively coupled through a switch to said portable electric power supply.

19. The method of claim 17, further comprising providing a retraction mechanism in said housing substantially between said pet treat compartment and said water bowl.

* * * * *